United States Patent [19]
Keller et al.

[11] Patent Number: 5,060,057
[45] Date of Patent: Oct. 22, 1991

[54] INTRAFRAME PROCESSOR AND LUMINANCE-CHROMINANCE ADAPTIVE SEPARATOR APPARATUS

[75] Inventors: Anton W. Keller, Zurich; Felix Aschwanden, Thalwil, both of Switzerland

[73] Assignee: RCA Licensing Corporation, Princeton, N.J.

[21] Appl. No.: 584,009

[22] Filed: Sep. 18, 1990

[51] Int. Cl.⁵ .............................................. H04N 9/78
[52] U.S. Cl. ........................................ 358/31; 358/12
[58] Field of Search .................................... 358/12, 31

[56] References Cited
U.S. PATENT DOCUMENTS 4,855,811  8/1989  Isnardi .................................... 358/12
4,885,631 12/1989  Fukinuki .............................. 358/11

Primary Examiner—James J. Groody
Assistant Examiner—Kim Yen Vu
Attorney, Agent, or Firm—Joseph S. Tripoli; Eric P. Herrmann; Ronald H. Kurdyla

[57] ABSTRACT

A television-type video signal containing main information, and auxiliary information modulating an auxiliary subcarrier having a controlled phase, is applied to a field storage network. First and second adaptive luminance-chrominance separators of the line comb filter type are coupled to the field storage network for receiving input signals from adjacent image fields, respectively. Chrominance outputs from the separators are combined to produce a separated main chrominance signal. Luminance outputs from the separators are combined to produce a separated main luminance signal. The modulated auxiliary subcarrier is derived from the field storage network.

8 Claims, 3 Drawing Sheets

INTRAFRAME PROCESSOR AND LUMINANCE-CHROMINANCE ADAPTIVE SEPARATOR APPARATUS

FIELD OF THE INVENTION

This invention concerns apparatus for separating encoded main and auxiliary television signal information, and for separating luminance and chrominance information.

BACKGROUND OF THE INVENTION

A conventional television receiver, such as a receiver in accordance with NTSC broadcast standards adopted in the United States and elsewhere, has a 4×3 image aspect ratio (the ratio of the width to the height of a displayed image). Recently, there has been interest in using higher aspect ratios for television systems, such as 5×3 or 16×9, since such higher aspect ratios more nearly approximate or equal the aspect ratio of the human eye than does the 4×3 aspect ratio of a conventional television display system.

One advantageous 5×3 aspect ratio widescreen television system, incorporating additional detail information to provide extended image definition, is described in U.S. Pat. No. 4,855,811—Isnardi. In that system, side panel image information and extended definition image information are encoded to provide an extended definition widescreen television signal which is compatible with pre-existing standard aspect ratio (4×3) television receivers. More specifically, high frequency side panel information and extended definition information are encoded by modulating a phase controlled auxiliary subcarrier associated with a first signal component. Low frequency side panel information is encoded by time compressing such information into a horizontal overscan region of main panel information, associated with a second signal component. The first and second signal components are combined to form an encoded NTSC compatible television signal which is transmitted to a receiver.

The input circuits of the receiver include an averager-differencer network which separates the first and second components of the NTSC compatible signal. The averager-differencer network includes a plurality of field memory devices, a low pass filter, and an adder for combining high frequency main panel luminance information and low frequency main panel luminance information to reconstitute a main panel image. Each of the field memories is a costly device, and the low pass filter requires a precise filtering characteristic with a sharp cut-off. In addition, the signals combined by the adder should exhibit precise synchronism. Apparatus according to the present invention advantageously eliminates the need for such low pass filter and adder, requires fewer field memory devices, and includes provision for separating the luminance and chrominance components of a color television signal.

SUMMARY OF THE INVENTION

In accordance with the principles of the present invention, apparatus for decoding a television-type video signal containing auxiliary information modulating an auxiliary subcarrier and containing main information with luminance and chrominance components, includes a storage network for providing first and second field delayed video signals and first and second adaptive luminance-chrominance separators of the line comb filter type each having luminance and chrominance outputs. The luminance outputs are combined and the chrominance outputs are combined. Signals provided from the storage network, containing information from adjacent image fields, are selectively coupled to the respective inputs of the luminance-chrominance separators.

In accordance with a feature of the invention, means for combining the luminance outputs of the luminance-chrominance separators includes means for attenuating the modulated auxiliary subcarrier in the luminance output signal.

In accordance with a further feature of the invention, a signal differencing network is coupled to the storage network for receiving signals containing information from adjacent image fields to produce an output field difference signal which includes the modulated auxiliary subcarrier.

BRIEF DESCRIPTION OF THE DRAWING

FIG. 1A shows an alternative version of a portion of the apparatus of FIG. 1.

DETAILED DESCRIPTION OF THE DRAWING

Figure 1:
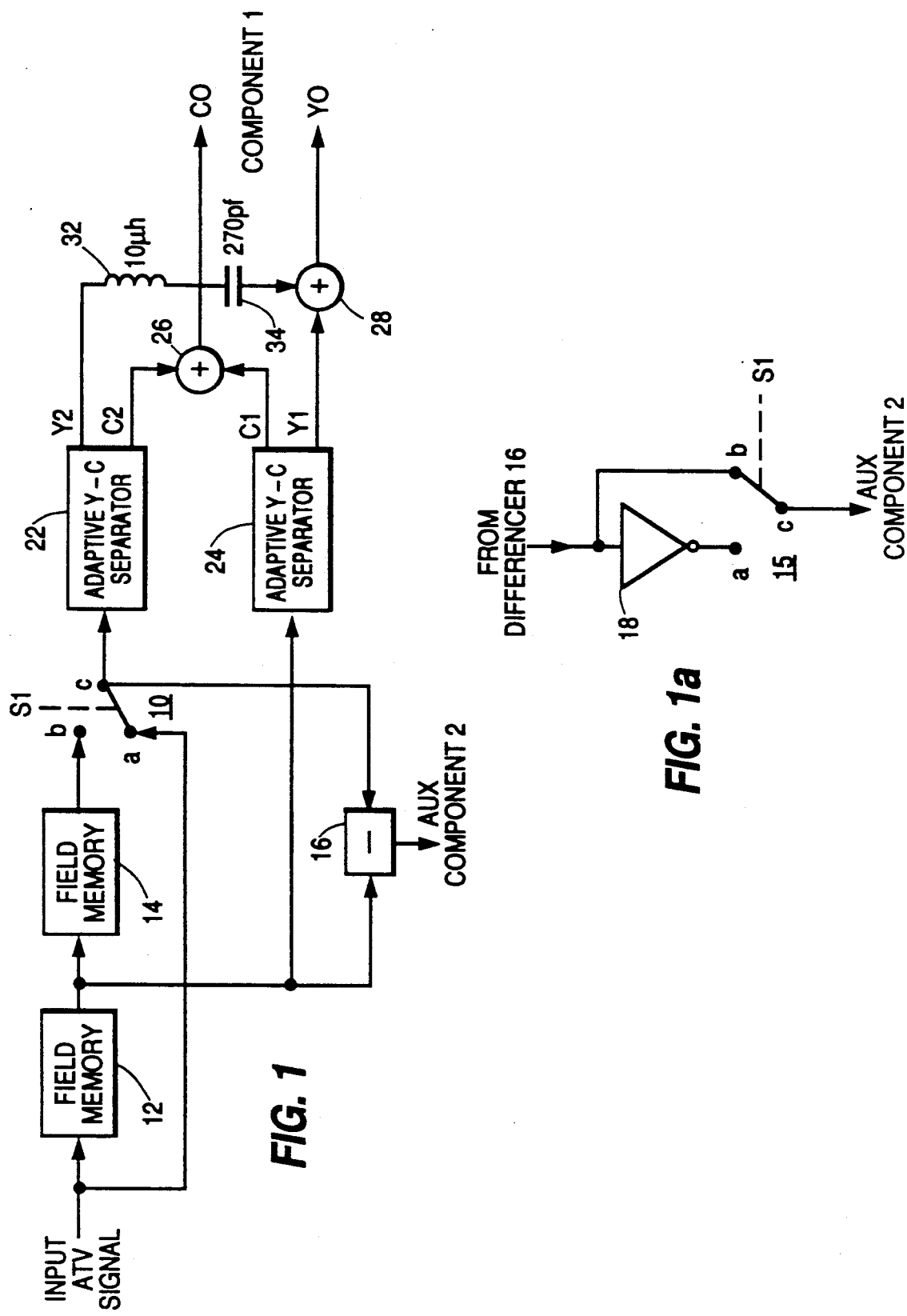
FIG. 1 shows averager-differencer and luminance-chrominance separator apparatus according to the present invention.

In FIG. 1, an input advanced television (ATV) signal is provided by a demodulator after processing by radio frequency (RF) and intermediate frequency (IF) circuits (not shown). The input ATV signal is a digital widescreen signal with encoded side panel and extended definition information. Specifically, the input signal includes first and second components which are to be separated for further processing. The first component includes main panel information, and encoded low frequency side panel information which has been time compressed and placed in horizontal image overscan regions of the main panel information. The second component includes a phase controlled auxiliary subcarrier quadrature modulated with high frequency side panel information and extra high frequency luminance information. The auxiliary subcarrier exhibits a frequency of approximately 3.1 MHz in this example, and a phase which reverses from one field to the next unlike the phase of a conventional chrominance subcarrier. The side panel chrominance information has been NTSC encoded such that the chrominance information modulates a 3.58 MHz subcarrier. Both the standard chrominance subcarrier frequency and the auxiliary subcarrier frequency are an odd multiple of one-half the horizontal line frequency. The encoded input ATV signal, as described above, is similar to the encoded compatible television signal described in detail in aforementioned U.S. Pat. No. 4,855,811.

The digital input signal is directly applied to an input terminal "a" of an electronic switch 10, and to an input terminal "b" of switch 10 via cascaded field memory devices 12 and 14. Switch 10 is controlled by a field rate signal S1 so that switch 10 changes position at the field rate. One input of a differencing network 16 receives a signal directly from an output of field memory 12. The other input of differencing network 16 receives a signal from an output "c" of switch 10, i.e., either the input ATV signal or a twice field delayed signal from the output of field memory 14, depending on the position of switch 10.

The encoded second component (COMPONENT 2) contains auxiliary signal information (AUX) and is obtained from the output of differencer 16 as follows. With switch 10 in the position shown, differencing network 16 receives the input ATV signal at one input (via switch 10) and the signal from the previous image field at its other input (via the output of field memory 12). A field difference signal, corresponding to encoded component 2, appears at the output of differencer 16. Switch 10 changes position for the next image field. Differencing network 16 obtains the difference between the same two field signals as stored in the field memories, but provides an output with an opposite polarity since the differencer input signals are interchanged for the next image field. The encoded field difference signal, i.e., component 2, developed at the output of differencer 16 includes a field phase reversing 3.1 MHz auxiliary subcarrier quadrature modulated with side panel high frequency information and extra high frequency image detail information. This information is recovered as discussed in U.S. Pat. No. 4,855,811, and as will be described subsequently with regard to FIG. 2, by means including a locally generated auxiliary subcarrier reference signal (ASC) having a frequency and a phase which reverses from field to field similar to the auxiliary subcarrier employed in the encoding process.

FIG. 1a illustrates apparatus for providing output auxiliary component 2 as a continuous wave fixed phase signal rather than as a signal having a field reversing subcarrier phase. In such case a reference signal ASC generated by the receiver/decoder of FIG. 2 also would be a continuous wave signal without a field reversing phase. In FIG. 1a signal S1 also controls the operation of a switch 15 so that it changes position at the field rate in synchronism with switch 10. An input "a" of switch 15 receives a signal from an output of differencing network 16 after inversion by an inverter 18. An input "b" of switch 15 receives a signal directly from the output of differencing network 16. As previously mentioned, differencing network 16 obtains the difference between the same two field signals as stored in the field memories for the illustrated position of switch 10, but provides an output with an opposite polarity for the other position of switch 10 since the differencer input signals are interchanged for the next image field. Such output polarity change is compensated for by means of inverter 18, with switch 15 in position "a".

Figure 3:
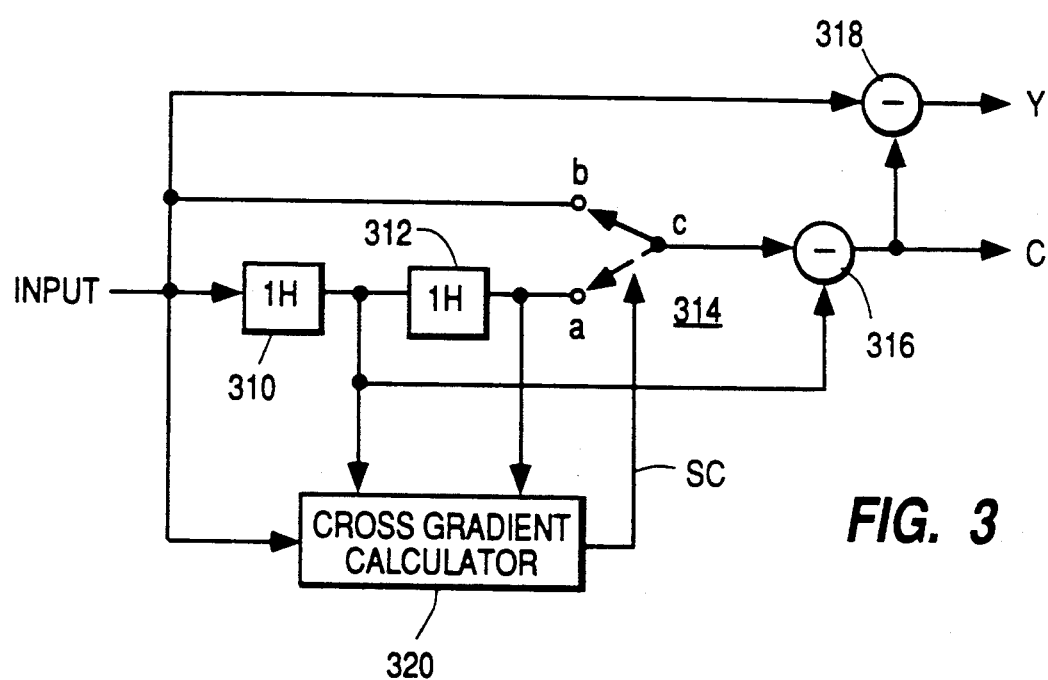
FIG. 3 shows details of a portion of the apparatus of FIG. 1.

The luminance and chrominance components of main panel information (COMPONENT 1) are separated by means of a network including luminance (Y) and chrominance (C) separators 22 and 24, adders 26 and 28, and a bandpass filter including an inductor 32 and a capacitor 34, arranged as shown. Separators 22 and 24 each include a digital-to-analog converter for providing analog output signals. In this example Y-C separators 22 and 24 are adaptive luminance-chrominance separators of the line comb filter type, as shown in FIG. 3 for example. FIG. 3 will be discussed subsequently. Briefly, each of separators 22 and 24 samples three vertically aligned pixels from three adjacent horizontal lines. Chrominance information is combed in accordance with a programmed algorithm to provide a combed chrominance output signal for each horizontal line. The combed chrominance output signals for units 22 and 24 are signals C2 and C1, respectively. The combed chrominance signals are internally subtracted from the precombed signal to produce combed luminance output signals Y1 and Y2 for units 24 and 22 respectfully. Separator units 22 and 24 receive substantially identical signals above about 1.8 MHz due to prior filtering at the transmitter/encoder. Units 22 and 24 exhibit substantially identical performance since they employ identical algorithms which respond to differences in subcarrier level around the current pixel. The chrominance subcarrier and the auxiliary subcarrier are identical within an image frame when, as in this example and as described in the Isnardi patent mentioned previously, center and side panel information 262H apart are respectively intraframe averaged at the encoder. In the process of intraframe averaging center and side panel chrominance information and high frequency luminance information are updated every frame rather than every field. Identical information is transmitted for each field within a given frame, except that the phase of the auxiliary subcarrier reverses from field-to-field.

Combed chrominance signals C1 and C2 from nominal first and second fields are combined by adder 26 to produce an analog output combed chrominance component CO for main signal component 1. Similarly, combed luminance signals Y1 and Y2 from nominal first and second fields are combined by adder 28 to produce an analog output combed luminance component YO for main signal component 1. In this example the modulated auxiliary subcarrier exhibits a carrier frequency of 3.1 MHz, which is within the baseband chrominance frequency range. Filter 32, 34 selectively passes the modulated auxiliary subcarrier so that only the modulated auxiliary subcarrier is cancelled in adder 28 when oppositely phased modulated auxiliary subcarrier components a field apart are summed. This selective cancellation process assures that the lower luminance frequencies containing temporal resolution remain untouched. It has been observed that a 20 db suppression of the modulated auxiliary subcarrier in the YO output signal, rather than complete cancellation, is sufficient. Thus, filter 32, 34 is not critical and need not exhibit precise operating parameters.

FIG. 3 shows additional details of one of identical adaptive line comb filters 22 and 24 of FIG. 1. An INPUT composite video signal containing luminance (Y) and chrominance (C) components is applied to a cascade combination of 1H (horizontal line) delay elements 310 and 312. A "soft" switch 314 receives an output signal from element 312 at an input "a", and the INPUT signal at an input "b". A first differencing unit 316 provides a combed chrominance output signal C representative of the difference between a signal developed at an output "c" of switch 314, and a 1H delayed signal developed at the output of element 310. A combed luminance output signal Y is developed by subtracting combed chrominance signal C from the INPUT composite signal in a second differencing unit 318.

The output signal of soft switch 314 corresponds to combed complementary portions of the input signals in response to a switch control signal SC, which controls the position of switch 314. Signal SC is provided from a cross gradient calculator unit 320, which receives the INPUT signal. Unit 320 also receives a 1H delayed signal from the output of element 310, and a 2H delayed signal from the output of element 312. The cross gradient calculator operates in accordance with a prescribed algorithm. In accordance with the algorithm, unit 320 analyzes vertically aligned pixels from a current line, a preceding line and a succeeding line. On the basis of the analysis unit 320 determines if the composite signal should be combed with respect to the previous line, the succeeding line, or with respect to some combination of the previous and succeeding lines by means of switch 314. The determination as to the type of combing action provided is a function of the absolute value of the respective chrominance subcarrier levels.

Figure 2:
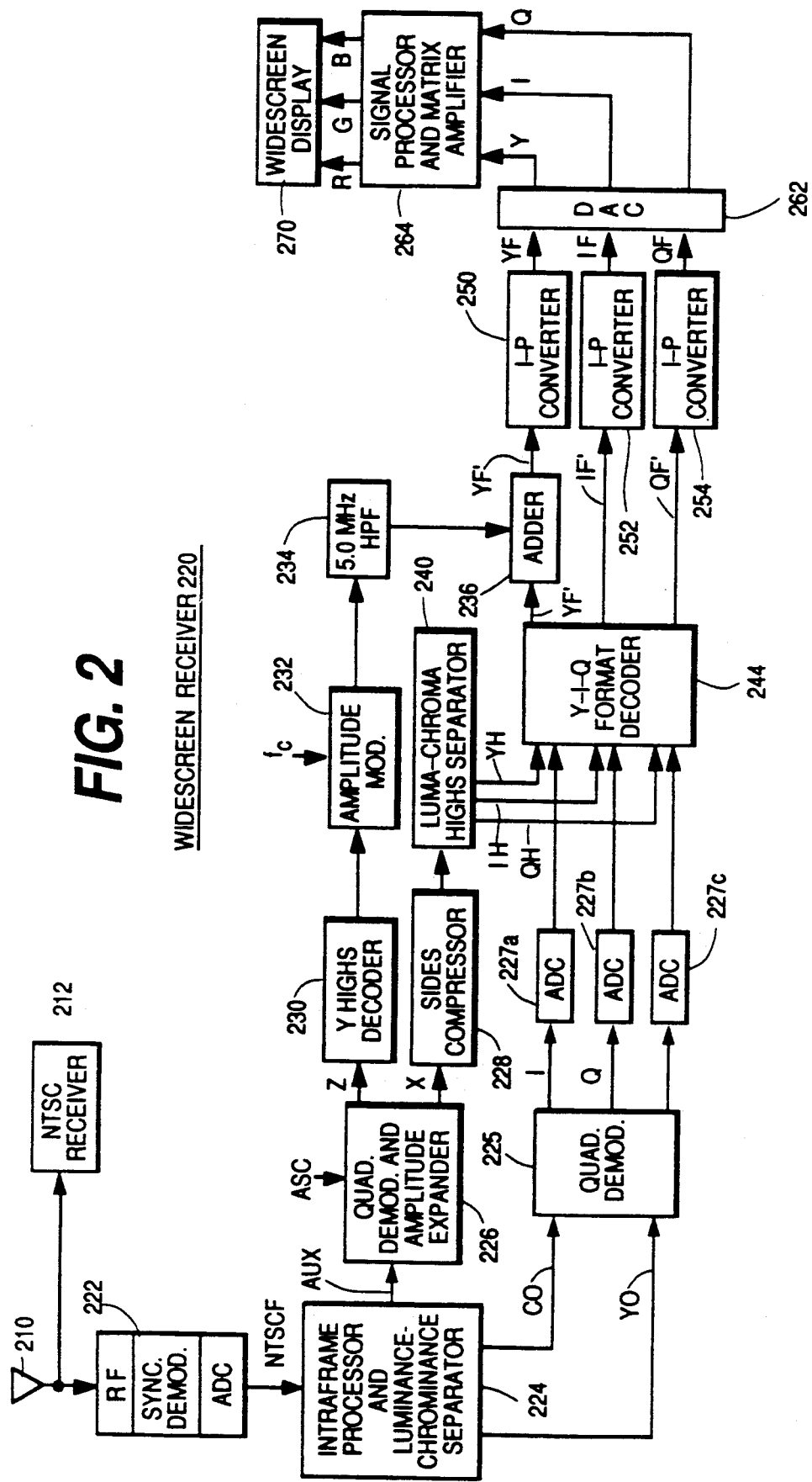
FIG. 2 is a block diagram of a portion of a widescreen television receiver/decoder incorporating the apparatus of FIG. 1.

The apparatus shown in FIG. 1 can be employed in a television receiver system as shown in FIG. 2. The system of FIG. 2, with the exception of elements 224, 225 and 227a–227c, is described in detail in previously mentioned U.S. Pat. No. 4,855,811—Isnardi. The arrangement of FIG. 2 receives an NTSC compatible, 5×3 aspect ratio widescreen television signal encoded as discussed in the Isnardi patent. Briefly, in the encoding process center panel information is time expanded to a 4×3 aspect ratio, and left and right NTSC encoded side panel high frequency information is time expanded. Low frequency side panel information is time compressed and placed in horizontal image overscan regions of the main panel information. A resulting main signal is intraframe averaged above 1.5 MHz. The time expanded side panel high frequency information and the extended definition information (additional high frequency luminance information between approximately 5.0 and 6.0 MHz) are intraframe averaged below about 1.5 MHz before quadrature modulating the 3.1 MHz auxiliary subcarrier. The phase of the auxiliary subcarrier reverses from field to field, in a manner unlike the phase of the standard chrominance subcarrier. The modulated auxiliary subcarrier and the main signal are combined to produce an NTSC compatible 4.2 MHz baseband signal, which modulates an RF picture carrier for broadcast.

The encoded NTSC compatible widescreen signal is intended to be received by both a standard NTSC receiver for producing a 4×3 aspect ratio displayed image, and by a widescreen EDTV receiver for producing a 5×3 aspect ratio displayed image. In FIG. 2 the compatible 2:1 interlaced widescreen EDTV television signal is received by an antenna 210 and applied to an antenna input of an NTSC receiver 212. Receiver 212 processes the compatible widescreen signal in normal fashion to produce an image display with a 4×3 aspect ratio, with the widescreen side panel information being in part compressed (i.e., "lows") into the horizontal overscan regions out of sight of the viewer, and being in part (i.e., "highs") contained in the modulated alternate subcarrier signal which does not disrupt the standard receiver operation.

The compatible widescreen EDTV signal received by antenna 210 is also applied to a widescreen progressive scan receiver 220 capable of displaying a video image with a 5×3 wide aspect ratio. The received widescreen signal is processed by an input unit 222 including radio frequency (RF) tuner and amplifier circuits, a synchronous video demodulator (a quadrature demodulator) which produces a baseband video signal, and analog-to-digital (ADC) converter circuits for producing a baseband video signal (NTSCF) in binary form. The ADC circuits operate at a sampling rate of four times the chrominance subcarrier frequency (4×fsc).

Signal NTSCF is applied to an intraframe processor and luminance-chrominance separator unit 224, which corresponds to the apparatus shown in FIG. 1. Auxiliary information signal AUX from unit 224 is coupled to a quadrature demodulator and amplitude expander 226 for demodulating auxiliary signals Z (additional high frequency luminance information) and X (time expanded side panel high frequency information) in response to a reference signal ASC with a field alternating phase, similar to that of the modulated auxiliary subcarrier.

A unit 228 time compresses the color encoded side panel highs so that they occupy their original time slots. A luminance (Y) highs decoder 230 decodes luminance horizontal highs signal Z into widescreen format. The sides are time compressed by the same amount as sides time expansion in the encoder, and the center is time compressed by the same amount as center time expansion in the encoder. The panels are then spliced together as explained in the Isnardi patent.

Modulator 232 amplitude modulates the signal from decoder 230 on a 5.0 MHz carrier $f_c$. The amplitude modulated signal is afterwards high pass filtered by a filter 234 with a 5.0 MHz cut-off frequency to remove the lower sideband. In the output signal from filter 234, center panel frequencies of 5.0 to 6.2 MHz are recovered, and side panel frequencies of 5.0 to 6.2 MHz are recovered. The signal from filter 234 is applied to an adder 236.

The output signal from compressor 228 is applied to a unit 240 for separating the luminance highs from the chrominance highs to produce signals YH, IH and QH. Main panel chrominance signals CO from unit 224 is separated into its constituent color difference components I and Q by means of a conventional analog quadrature color demodulator 225 which may be of the burstlocked type. Main panel color difference components I and Q, and main panel luminance component YO, are converted to digital form by analog to digital converters 227a, 227b and 227c, respectively. These signals and side panel highs signals IH, QH and YH from luma-chroma highs separator 240 are provided as inputs to a Y-I-Q format decoder 244, which decodes the luminance and chrominance components into widescreen format. The side panel lows are time expanded, the center panel is time compressed, the side panel highs are time compressed and added to the side panel lows, and the side panels are spliced to the center panel. Luminance signal YF' from decoder 244 is coupled to adder 236 where it is summed with the signal from filter 234. By this process recovered extended high frequency horizontal luminance detail information is added to decoded luminance signal YF'. Signals YF', IF' and QF' from unit 244 are converted from interlaced to progressive scan format by means of coverters 250, 252 and 254, respectively.

Widescreen progressive scan signals YF, IF and QF are converted to analog form by means of a digital-to-analog converter 262 before being applied to a video signal processor and matrix amplifier unit 264. The video signal processor component of unit 264 includes signal amplifying, DC level shifting, peaking, brightness control, contrast control and other conventional video signal processing circuits. Matrix amplifier 264 combines luminance signal YF with color difference signals IF and QF to produce color image representative video signals R, G and B. These color signals are amplified by display driver amplifiers in unit 264 to a level suitable for directly driving a widescreen color image display device 270, e.g., a widescreen kinescope.

What is claimed is:

1. Apparatus for decoding a television-type video signal containing auxiliary information modulating an auxiliary subcarrier other than a chrominance subcarrier, and main information containing luminance and chrominance components, comprising:

memory means having an input for receiving said video signal, a first output for providing a first field delayed signal, and a second output for providing a second field delayed signal relative to said first field delayed signal;

a first adaptive luminance-chrominance separator of a line comb filter type, having an input, a luminance output and a chrominance output;

a second adaptive luminance-chrominance separator of a line comb filter type, having an input, a luminance output and a chrominance output;

first means for combining signals from said luminance outputs of said first and second adaptive separators;

second means for combining signals from said chrominance outputs of said first and second adaptive separators; and means for selectively coupling signals from said memory means to said inputs of said first and second adaptive separators, said coupled signals containing information from adjacent image fields.

2. Apparatus according to claim 1, wherein:
    said first combining means includes means for attenuating said modulated auxiliary subcarrier.

3. Apparatus according to claim 1, and further comprising:
    bandpass filter means for selectively coupling said modulated auxiliary subcarrier from said luminance output of said first adaptive separator to said first combing means.

4. Apparatus according to claim 1, and further comprising:
    signal differencing means coupled to said selective coupling means for receiving signals containing information from adjacent image fields to produce an output field difference signal comprising said modulated auxiliary subcarrier.

5. Apparatus according to claim 1, wherein
    said memory means comprises (a) a first field storage device having an input for receiving said video signal, and an output for providing said first delayed signal; and (b) a second field storage device having an input for receiving said first field delayed signal, and an output for providing said second field delayed signal; and said selective coupling means comprises field rate switching means having a first input for receiving said video signal, a second input for receiving said second field delayed signal, and an output coupled to said input of said first adaptive separator means; and said input of said second adaptive separator means is coupled to said output of said first field storage device.

6. Apparatus according to claim 5 and further comprising:
    signal differencing means having a first input coupled to said output of said first field storage device, a second input coupled to said output of said field rate switching means, and an output; and output means coupled to said output of said signal differencing means for providing an output field difference signal comprising said modulated auxiliary subcarrier.

7. Apparatus according to claim 6 wherein said output means comprises:
    signal inverter means having an input coupled to said output of said signal differencing means, and an output; and field rate switching means having a first input coupled to said output of said inverter means, a second input coupled to said output of said differencing means, and an output for providing said output field difference signal.

8. Apparatus according to claim 1, wherein:
    said television signal is a widescreen signal having an image aspect ratio greater than that of a pre-existing television signal, said main information is main panel information, and said auxiliary information is side panel information.

* * * * *